United States Patent
Phegley

[15] 3,672,702
[45] June 27, 1972

[54] SAFETY HITCH DEVICE
[72] Inventor: Wilbur H. Phegley, Lone Pine, Calif.
[73] Assignee: Howard L. Miller, Lone Pine, Calif.; a part interest
[22] Filed: June 18, 1970
[21] Appl. No.: 47,417

[52] U.S. Cl. .................................................. 280/457
[51] Int. Cl. .................................................. B60d 1/12
[58] Field of Search .................. 280/457, 511, 504, 461

[56] References Cited

UNITED STATES PATENTS 3,549,173  12/1970  Stanfield .............................. 280/457
3,326,576  6/1967  Kothmann ............................ 280/457

Primary Examiner—Benjamin Hersh
Assistant Examiner—Robert R. Song
Attorney—Fulwider, Patton, Rieber, Lee & Utecht

[57] ABSTRACT

A safety chain arrangement combined with a conventional ball hitch and including a bracket mounted on the towing vehicle in overhanging relation with the ball hitch, a connector welded to the tongue of the towed vehicle over the ball socket, and a safety chain extending between the connector and the bracket and detachably fastened to the latter.

15 Claims, 5 Drawing Figures

PATENTED JUN 27 1972 3,672,702
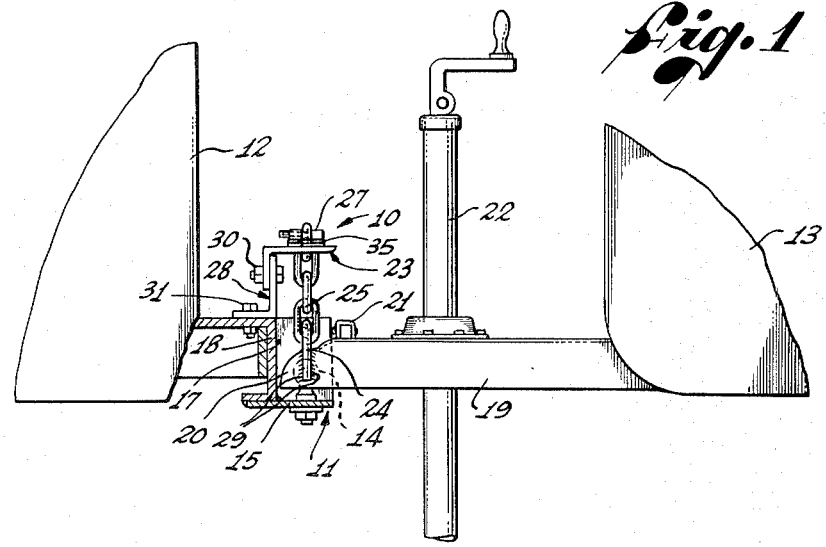
Fig. 1
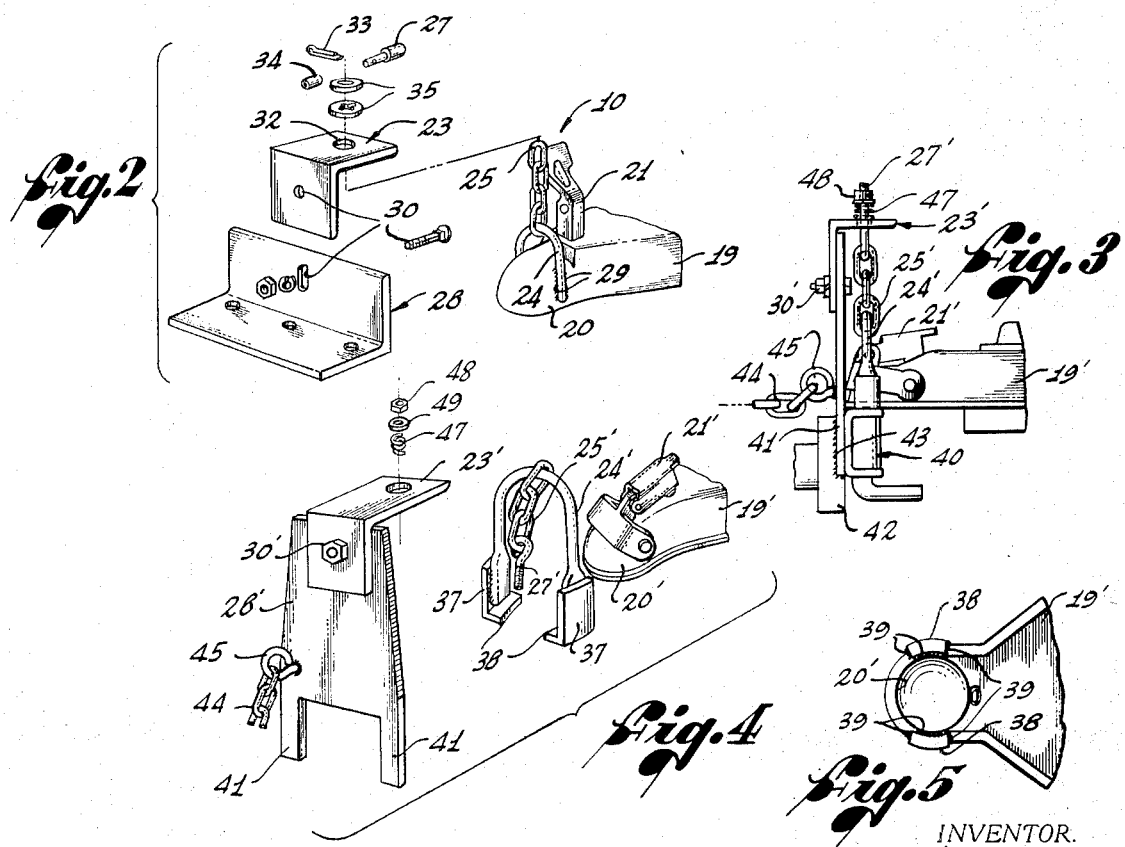
Fig. 2
Fig. 3
Fig. 4
Fig. 5
INVENTOR.
WILBUR H. PHEGLEY
BY Fulwider, Patton, Rieber,
Lee, and Utecht
ATTORNEYS

SAFETY HITCH DEVICE

BACKGROUND OF THE INVENTION

This invention relates to a safety chain arrangement for use with a hitch assembly secured to a towing vehicle and including a hitch element, typically a ball hitch, for coupling engagement with a second hitch element on a towed vehicle, typically a downwardly opening socket in the forward end of a tongue on the towed vehicle.

For safety purposes, and as required by law, a safety chain or equivalent device must be connected to the towed and towing vehicles, and must be of sufficient strength to control the towed vehicle in the event of failure of the regular hitch or coupling. A conventional arrangement uses a pair of chains which are secured to the tongue and extend forwardly on each side of the tongue to the towing vehicle, sufficient slack being allowed in each chain to avoid interference with turning of the vehicles. The forward ends of the chains usually are attached to the supporting elements of the bumper structure. Should the regular hitch fail, the tongue drops away from its normal position but is prevented by the chains from separating completely from the towing vehicle, thus saving the towed vehicle so that an emergency stop can be made.

Several modifications have been proposed as safety chain arrangements to avoid the drop of the tongue that accompanies a hitch failure, to simplify the attachment of the safety chains, and to increase the ruggedness and effectiveness of the safety chain arrangement. While these serve their intended purposes, each such modification is subject to one or more limitations and falls short of an optimum arrangement.

SUMMARY OF THE INVENTION

The present invention resides in a novel and relatively inexpensive safety chain device that is readily adaptable to existing hitch assemblies with a minimum of expense and effort, which effectively connects the vehicles together independently of the ball hitch assembly and the ball mount, which minimizes any change in tongue position accompanying a hitch failure thereby to avoid adverse effects on both towing and towed vehicles, and which is extremely simple to couple between the two vehicles. In short, the present invention is believed to optimize the accomplishment of all of the objectives of prior safety hitches in a simple and inexpensive manner.

For these purposes, the preferred embodiment of the invention comprises a bracket mountable on the towing vehicle in spaced, overhanging relation with the ball hitch, a connector secured as by welding to the tongue of the towed vehicle and disposed above the socket therein, a short length of chain extending upwardly for this connector to the bracket, and a manually operated connector for attaching the chain to, and detaching it from, the bracket. Preferably, the chain extends through the bracket and is fastened thereto by a headed pin with a releasable abutment on one end, and with one or more shims for taking up slack in the chain, and the lower connector is an inverted U-shaped bar with legs straddling the socket and welded either to the sides or to the underside of the tongue. The bracket is carried on a plate bolted to the vehicle bumper or attached to the ball mount, depending upon the type of hitch used, and the plate should be independently attached to the frame if attached to the ball mount.

Other objects and advantages will be apparent from the following detailed description, taken in conjunction with the accompanying drawings.

BRIEF DESCRIPTION OF THE DRAWINGS

FIG. 1 is a fragmentary side elevational view showing parts of towing and towed vehicles coupled together by a ball hitch assembly and a safety hitch device embodying the novel features of the present invention;

FIG. 2 is an enlarged exploded perspective view of parts shown in FIG. 1;

FIG. 3 is a side elevational view similar to part of FIG. 1 but showing a modified form of the safety chain device;

FIG. 4 is an exploded perspective view of the modified form of FIG. 3; and

FIG. 5 is a fragmentary bottom view of the hitch element of the towed vehicle showing part of the modified form of the safety chain device.

DETAILED DESCRIPTION

As shown in FIGS. 1 and 2 for purposes of illustration, the invention is embodied in a safety chain device 10 combined with a conventional ball hitch assembly 11 coupling a towing vehicle 12 such as a pick-up truck and a towed vehicle 13, which herein is shown as a travel trailer. The ball 14 of the hitch assembly is mounted on a horizontal ledge 15 forming the bottom of an indentation 17 in the bumper 18 of the truck, and the trailer has a tongue 19, typically an "A" frame, which extends forwardly from the trailer body and has a downwardly opening ball socket at 20 in the front end of the tongue for fitting downwardly over the ball 14. A latch 21 is provided for holding the ball in the socket, and a jack 22 often is provided to hold the tongue generally horizontal when the trailer is uncoupled.

In accordance with the present invention, the safety chain device 10 comprises a bracket 23 mounted on the towing vehicle 12 in spaced, overhanging relation with the ball 14, a connector 24 secured to the tongue 19 beneath this bracket and fastening a short length of safety chain 25 to the tongue directly beneath the bracket, and a manually engageable and disingageable connector 27 for securing the upper end of the chain to the bracket. With this arrangement, the safety chain may be installed on the tongue simply by welding the first connector 24 thereto, and the bracket 23 may be installed by bolting it to a mounting plate 28 bolted or otherwise fastened to the bumper 18 or other part securely fixed to the towing vehicle. Then the ball hitch elements 14 and 20 are coupled in the usual manner, simply by backing the truck up to the trailer until the elements are aligned, and lowering the socket over the ball. As the ball is latched, the chain 25 is attached to the bracket 23 and the hitching operation is complete.

In the form shown in FIGS. 1 and 2, the tongue connector 24 is simply an inverted U-shaped bar having legs straddling the tongue 19 on opposite sides of the socket 20 and welded to the tongue as indicated at 29. Of course, the connector is inserted through the lower link of the chain 25 before being welded in place. With the type of latch 21 shown in FIGS. 1 and 2, the connector is spaced forwardly from the latch and thus need be spaced above the top of the tongue only far enough to accommodate the chain. The chain should be free to slide along the top of the connector to a limited extent to accommodate a slight lateral swinging motion of the bracket 23 during turning.

The bracket 23 is simply a piece of angle iron having a horizontal portion overhanging the ball 14 and a vertical portion which facilitates mounting of the bracket on the mounting plate 28. The latter is shown in FIGS. 1 and 2 as a similar piece of angle iron having a vertical portion bolted at 30 to the vertical portion of the bracket, and having a horizontal portion bolted at 31 to the bumper 18 of the truck. The bolt 30 preferably is a carrige bolt fitting non-rotatably in the hole in the plate 28, which hole may be a vertically elongated slot to permit limited up-and-down adjustment of the bracket.

While one bolt 30 is shown between the two pieces of angle iron and three preferably are used to hold the mounting plate 28 on the bumper 18, it will be evident that secure attachment of the elements may be accomplished in various ways. It is to be noted, however, that the bracket 23 can be readily removed from the mounting plate 28, if desired, when the hitch is not in use. To facilitate such removal and subsequent reassembly, the bolt 30 may be replaced with a quick-release fastener (not shown) such as a lever-actuated latch, or fastened with a one-armed wing nut for quick removal.

As shown most clearly in FIG. 2, a hole 32 is drilled in the overhanging portion of the bracket 23 to pass the upper end of the chain 25 through the bracket, and the connector 27 is a pin having a head on one end and a hole adjacent its other end for receiving a cotter pin 33 or the like. This pin is inserted through the upper link of the chain so that the head abuts against one side of the terminal link, and a spacer sleeve 34 is telescoped onto the other end of the pin and held releasably thereon by the cotter pin 33. This holds the chain generally centered on the pin 27.

The length of the safety chain 25 is selected so that there is very little, if any, slack in the chain after the pin 27 has been inserted above the bracket 23. If the size of the chain links is such that excessive slack is present, one or more apertured shims 35 should be positioned between the bracket 23 and the pin 27 with the chain projecting through the shims. Various weights of chain and numbers of links may be used, experience having shown that a four link chain is suitable for the first form and either four or five links being used for the second form because of the higher connector used.

In the modified form shown in FIGS. 3–5, in which corresponding parts are indicated by corresponding primed reference numbers used in FIGS. 1 and 2, the tongue 19' of the trailer is of another conventional type having a latch 21' overlying the socket 20'. To secure the chain 25' to such a tongue, a modified connector 24' is used to avoid interference with the latch. This connector also has an inverted U-shaped bar which is disposed over the socket with clearance around the latch, each lower end of the bar having a mounting lug 37 thereon with an inwardly turned flange 38 on its lower end for extending partially under the tongue on each side of the socket 20'. These lugs are welded at 39 (FIG. 5) to the underside of the tongue.

A second modification in this form of the safety hitch device is the mounting for holding the bracket 23' on the towing vehicle, and is designed for use with a frame hitch of the type having a ball mount 40 (FIG. 3) including a head carried in another conventional manner on a supporting structure (not shown) attached to the vehicle frame.

In this instance, the bracket 23' is bolted at 30' to the upper end portion of a notched upright supporting plate 28' having laterally spaced depending lugs 41 on its lower end for straddling rearwardly projecting blocks 42 on the head. The mounting plate is positioned with these blocks in the notch so that the lugs 41 fit closely around the blocks 42, and then is welded as at 43 (FIG. 3) to the blocks.

Since this plate is attached solely to the ball mount 40, at least one back-up safety chain 44, or some other tie member, should be attached to the plate 28', for example, by an eye bolt 45 as shown in FIGS. 3 and 4. This chain is attached to the frame of the vehicle so that a failure of the ball mount cannot detach the bracket 23' from the vehicle. If desired, two such backup chains can be used.

Another possible modification illustrated in this form of the invention is the replacement of the pin-type connector 27 with a threaded fastener 27' in the form of an eye bolt on the upper end of the chain, this being shown in FIGS. 3 and 4. The shank of this eye bolt extends well above the bracket 23' and has a coiled compression spring 47 telescoped onto the shank between the bracket and a nut 48 threaded on the upper end of the bolt, preferably with a washer 49 under the washer. This also is a manually operable connector, and the spring 47 provides a limited degree of yieldability for the chain 25'.

From the foregoing, it will be seen that the present invention provides a safety hitch device of relatively simple construction which is quickly and easily coupled and which holds the tongue of the towed vehicle in substantially the same position after a failure of the primary hitch. Accordingly, the safety device maintains more effective control of the towed vehicle and avoids jolts and shocks that can occur with most of the prior safety devices when the primary hitch fails.

It also will be evident that, while preferred embodiments have been shown and described, various modifications and changes may be made without departing from the spirit and scope of the invention.

I claim:

1. In combination with a hitch assembly secured to a towing vehicle and including a first hitch element, and a tongue for a towed vehicle having a second hitch element engageable with said first hitch element to couple the tongue to the hitch assembly, a safety hitch device comprising:
    a bracket;
    means mounting said bracket on said towing vehicle in spaced overhanging relation with said first hitch element with clearance beneath said bracket for movement of said second hitch element into coupled relation with said first hitch element;
    a connector secured to said tongue at said second hitch element for movement into a position very close to said first hitch element and generally under said bracket as the hitch elements are moved into coupled relation;
    a safety member fastened at one end to said connector to extend substantially vertically upwardly therefrom to said bracket and lying substantially entirely beneath said bracket;
    and manually engageable and releasable means for securing the other end portion of said member to said bracket above said second hitch element to couple said tongue to said towing vehicle independently of said hitch elements to control the towed vehicle in case of failure of the hitch elements and to prevent any substantial downward displacement of said tongue after such failure.

2. The combination defined in claim 1 in which said first hitch element comprises a ball mount secured to said towing vehicle and an upstanding ball thereon, and said second hitch element is a downwardly opening socket on said tongue, said connector being fastened to said tongue around the portion thereof defining said socket.

3. The combination defined in claim 2 in which said vehicle has a bumper adjacent said ball mount, and said mounting means supports said bracket from said bumper.

4. The combination defined in claim 2 in which said ball mount is secured to the frame of said towing vehicle, and said mounting means is secured to the ball mount to project upwardly therefrom and support said bracket above said ball, said mounting means being connected to said frame independently of said ball mount.

5. The combination defined in claim 2 in which said member is a chain of preselected length sufficient to project through and above said bracket, the latter having an opening generally above said connector for passing the upper end portion of said chain through the bracket, and said releasable means being a second connector passed through the chain above the bracket.

6. The combination defined in claim 5 in which said second connector is a pin having a fixed abutment on one end and a releasable abutment on the other end.

7. The combination defined in claim 5 further including at least one apertured shim around said chain above said bracket and beneath said second connector for taking up slack in said chain.

8. A safety chain device in combination with a first hitch element formed by a ball and ball mount secured to a towing vehicle and a second hitch element formed by a downwardly opening socket at the free end of a tongue on a towed vehicle coupled to the first hitch element, said safety hitch device comprising:
    a bracket;
    means for mounting said bracket on the towing vehicle in spaced overhanging relation with said first hitch element;
    a connector on said second hitch element at said free end in position to be disposed between the latter and said bracket when the hitch elements are coupled, said connector being an inverted U-shaped bar having legs for straddling the tongue on opposite sides of the socket;
    a safety chain fastened at one end of said connector to extend upwardly to said bracket;
    and manually engageable and releasable means for securing said chain to said bracket generally above said connector to couple the second hitch element to the towing vehicle independently of said first hitch element; thereby to control the towed vehicle in case of uncoupling of said hitch elements.

9. A safety hitch device as defined in claim 8 in which said bracket is formed with an opening for passing the upper end of said chain through the bracket, and said engageable and releasable means includes a pin for insertion through the chain above the bracket, a head on one end of said pin, and a removeable abutment on the other end of the pin.

10. A safety hitch device as defined in claim 9 in which said head and said abutment cooperate to hold the chain generally centered on said pin.

11. A safety hitch device as defined in claim 9 further including at least one apertured shim through which said chain projects above said bracket and beneath said pin, for taking up slack in the chain.

12. A safety hitch device as defined in claim 8 in which said mounting means includes a plate boltable to the bumper of the towing vehicle.

8. A safety hitch device as defined in claim 8 in which said mounting means includes a plate for connection to the ball mount, and further including at least one tie member for anchoring said plate to the towing vehicle.

14. A safety hitch device as defined in claim 8 in which said manually engageable and releasable means include an eye bolt on the upper end of said chain having a shank for extending through said bracket, a nut threaded onto said shank, and a compression spring beneath said nut for engaging said bracket and providing a limited degree of yieldability for said chain.

15. A safety hitch device as defined in claim 8 in which said ball is mounted on and secured to said towing vehicle by means independent from the means which mount said bracket on said vehicle, whereby failure of said ball-mounting means will not result in failure of said bracket mounting means.

* * * * *